Patented June 28, 1938

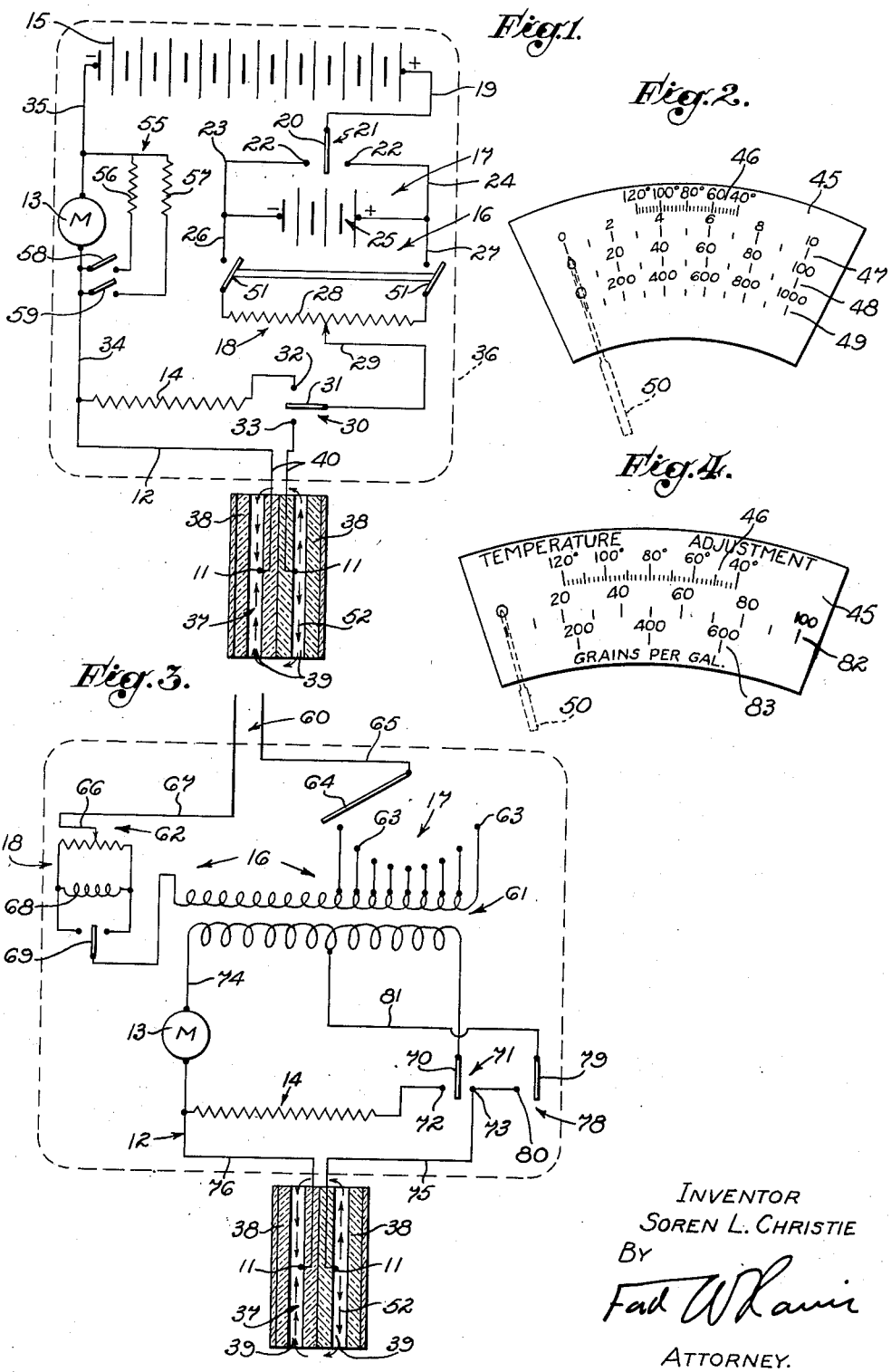

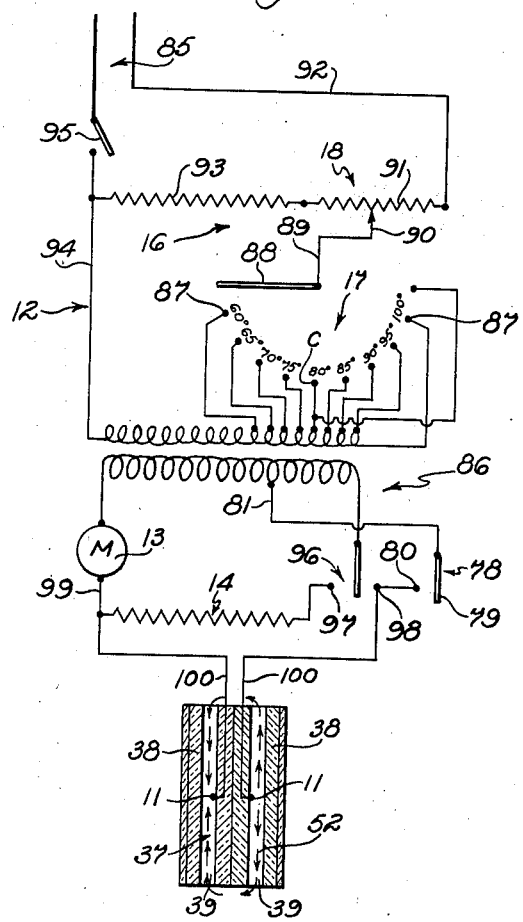
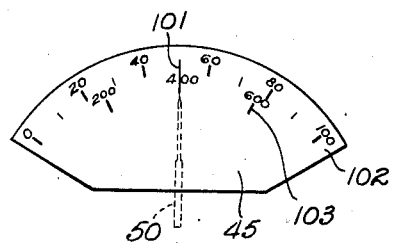

2,122,364

UNITED STATES PATENT OFFICE 2,122,364

COMPENSATED CONCENTRATION TESTING SYSTEM AND METHOD

Soren L. Christie, Los Angeles, Calif.

Application June 5, 1936, Serial No. 83,661

10 Claims. (Cl. 175—183)

My invention relates to a novel method and apparatus for measuring the electric conductivity of fluids, usually liquids, to indicate concentration of impurities or other substances therein, or to indicate the electric conductivity of the fluid for any other purpose.

For instance, the invention may be used to indicate the solid content in a stream or body of water or may be used to indicate the presence of foreign matter in condensed steam, boiler waters, etc.

It is an object of the present invention to provide a novel system, usually of portable character, for measuring electric conductivity of fluids.

Up to the present time it has been customary in conductivity testing instruments to provide electrodes mounted in fixed relation to a container in which the liquid to be tested is positioned, the mounting, and sometimes also the container, being part of the instrument. However, I have chosen to illustrate the present invention as a system utilizing an electrode cartridge of the general character disclosed in my co-pending application Serial No. 29,575, "Concentration testing apparatus and method", filed July 2, 1935. This cartridge is adapted to be immersed in the fluid to be tested and is usually self-contained and independent of a fixed base.

In the apparatus to be hereinafter described, I have illustrated a visible indicating means in the form of a calibrated current-responsive meter which indicates the electric conductivity or related phenomena of the fluid by measuring the current flow through current paths in the fluid between the electrodes of the cartridge.

In testing fluids of widely varying concentrations and temperatures, it is desirable to be able to calibrate the indicating means or meter in accordance with the temperature of the fluid to be tested, and also to be able to electrically change the conditions tending to send current through the fluid between the electrodes.

It is therefore an object of the present invention to provide an apparatus for testing the concentration of a fluid which includes in combination with a current-responsive indicating means, a calibrating means for calibrating the indicating means in accordance with the temperature of the fluid being tested.

It is another object of the invention to provide a system of the character described in the above paragraph in which a calibrating means in the form of a calibrating impedance is connected in circuit with the current-responsive indicating means.

It is another object of the invention to provide an adjustment means for varying the potential applied to the impedance to calibrate the indicating means in accordance with the temperature of the fluid being tested.

Another object of the invention resides in the provision of an apparatus which includes a pair of electrodes immersible in the fluid to be tested, a current-responsive indicating means, a calibrating impedance, an adjustment means for varying the potential applied to the impedance, a switch means for selectively completing a circuit from the adjustment means through the impedance and the indicating means, or completing the circuit to the electrodes and the indicating means.

It is another object of the invention to provide an apparatus of the character described in the above paragraph which includes an adjustment means comprising a voltage regulating means and a compensating means for varying the potential applied to the impedance to calibrate the indicating means when the circuit is completed through the impedance, and for impressing potentials of different magnitude across the electrodes when the circuit is completed to the electrodes.

It is another object of the invention to provide an auxiliary voltage regulating means for varying the potential applied to the electrodes when the circuit is completed thereto without disturbing the adjustment of the main voltage regulating means after the indicating means has been calibrated.

It is a further object of the invention to provide means for varying the resistance in the circuit to current flowing to the indicating means without changing the potential applied to the circuit after the indicating means has been calibrated.

It is a still further object of the invention to provide a novel method of calibrating a direct-reading, current-responsive indicating means in accordance with the temperature of a fluid to be tested for electric conductivity to determine the concentration of impurities or other substances in the fluid.

These and other objects and features of the invention will be made clear in the following part of the specification.

Referring to the drawings,

Fig. 1 is a wiring diagram illustrating a combination of parts and the relationship thereof comprising one form of my invention.

Fig. 2 is a face view of a dial suitable for use in connection with a direct-reading indicating means embodied in my invention and suitable for use in connection with the apparatus disclosed in Fig. 1.

Fig. 3 is a diagram illustrating a combination comprising an alternative form of the invention.

Fig. 4 is a face view of an alternative form of dial for the direct reading indicating means of the invention.

Fig. 5 is a diagram illustrating still another form of the invention.

Fig. 6 is a face view of a dial for the indicating means embodied in the form of the invention disclosed in Fig. 5.

My invention comprises in its broadest concept a plurality of electrodes 11 connected in a circuit 12, which circuit includes a current-responsive indicating means 13 and a calibrating means 14 for calibrating the indicating means 13.

With reference to Fig. 1, I show one form of my invention in which the circuit 12 is supplied with current from a main potential source 15 which, in this form of the invention, preferably comprises a storage or dry battery having rather high potential. A source of approximately 50 volts has been found adequate in most instances.

In connection with the calibrating means 14, I prefer to provide an adjustment means, generally designated by the numeral 16, for varying the potential applied to the calibrating means 14 and for impressing potentials of different magnitudes across the electrodes 11. The adjustment means 16 of this form of the invention preferably includes a voltage regulating means 17 and a compensating means 18 shown in the form of a potentiometer, the details of which will now be described in connection with the various parts of the invention generally mentioned above.

Connected to one terminal of the main potential source 15, such as the positive terminal thereof, is a conductor 19 which in turn is connected to a movable contact 20 of a reversing switch 21 including a pair of contacts 22, these contacts 22 being connected by conductors 23 and 24 to opposite sides of an auxiliary potential source 25 which, in this form of the invention, preferably comprises a storage or dry battery. By this arrangement the auxiliary potential source 25 can be connected to the main potential source 15 in additive or subtractive relation thereto depending on the position of the contact arm 20 with respect to the contacts 22 of the reversing switch. The main potential source 15, the auxiliary potential source 25, and the reversing switch 21 thus comprise the voltage regulating means 17 of this form of the invention.

Connected across the auxiliary potential source 25 as by conductors 26 and 27 is a potentiometer 28 having a movable lead 29 connected to a reversing switch 30 comprising a contactor 31 and a pair of contacts 32 and 33. The potentiometer 28 comprises the compensating means 18 included in the adjustment means 16 of the invention.

One of the contacts of the reversing switch 30, such as the contact 32, is connected to the calibrating means 14 of the invention which comprises an impedance of suitable character, such as a resistance. The calibrating means or impedance 14 is connected to one side of the current-responsive indicating means 13 by conductor means 34, the other side of the indicating means 13 being connected to the negative terminal of the main potential source 15 by a conductor 35.

In practice, the parts of the invention thus far described, with the exception of the electrodes 11, are preferably enclosed in a suitable container or box of portable character, as indicated by the dotted line 36.

The electrodes are preferably associated with an electrode cartridge 37 of the general character disclosed in my co-pending application mentioned above and which may include a pair of suitably insulated tubes 38 providing axial passages 39 in which the electrodes 11 are positioned so as to be in contact with a fluid in which the cartridge 37 is immersed. The electrodes 11 are respectively connected, as by insulated conductors 40, to the contact 33 of the reversing switch 30 and to the conductor 34 leading to the indicating means 13, substantially as indicated. The conductors 40 in practice are of considerable length so that the cartridge 37 may be conveniently immersed in a container of fluid to be tested. It should be understood that although I have disclosed the electrode cartridge 37 as including only two electrodes 11, a greater number of electrodes may be used or various arrangements of the electrodes may be made to change the length of the current path through the fluid or to change the number of current paths available for sending current through the fluid, as disclosed in detail in the mentioned co-pending application.

In Fig. 2, I show a dial 45 which is provided for direct reading of the indicating means 13, the dial being graduated to provide a plurality of scales one of which, as indicated by the numeral 46, being the calibrating scale of the indicating means. The other scales, respectively indicated by the numerals 47, 48, and 49, are graduated to indicate the concentration of foreign substances in a fluid, for instance, in grains per gallon.

I have shown a double pole switch 51 across the conductors 26 and 27 between the auxiliary potential source 25 and the potentiometer 28, the switch 51 being preferably of the push-button type, which completes the circuit only while being manually depressed. This permits only periodic drainage of current from the source during calibration or testing.

The operation of this form of the invention is as follows: In order to calibrate the indicating means 13 to correctly measure the conductivity of fluids of widely varying concentration and of various temperatures with the same indicating means, I prefer to establish the temperature of the fluid as an arbitrary calibration medium, the scale 46 of the dial 45 being graduated in degrees Fahrenheit, as shown in Fig. 2. With the reversing switch 21 closed, the contactor 31 of the switch 30 is moved into engagement with the contact 32, either before or after the cartridge 37 is immersed in the fluid to be tested. This completes the circuit between the main potential source 15 through the adjustment means 16, the impedance 14, and the indicating means 13. The adjustment means 16 is then operated to vary the potential applied to the impedance 14 so that the needle 50 of the indicating means 13 points to a graduation on the scale 46 which corresponds to the predetermined temperature of the fluid to be tested. This may be done usually by moving the movable lead 29 of the potentiometer 28 which varies the potential applied to the impedance 14, but if desired, the reversing switch 21 may be reversed to afford additional variation of the potential applied to the impedance. The double pole switch 51 is closed during this operation. The calibration scale is so correlated relative to the indicating means and the fluid to be tested that this single adjustment will compensate both for voltage variations of the source and the temperature of the fluid to be tested to calibrate the instrument for subsequent conductivity tests of fluid at the temperature to which the instrument was calibrated. The single adjustment feature compensating for temperature as well as voltage variation is an important part of this embodiment of the invention.

After the indicating means has been suitably calibrated, as above described, in accordance with the temperature of the fluid to be tested, the switch 30 is operated to engage the contact 33. This completes the circuit from the main potential source 15 through the adjustment means 16 to the electrodes 11 when the double pole switch 51 is closed, thus impressing a potential across the electrodes. The current flowing in a current path between the electrodes, as shown by the arrows 52, is indicated by the indicating means 13 on one of the scales, such as the scale 47.

It is not desirable, after the indicating means 13 has been calibrated and during the time that the circuit is completed across the electrodes 11, to change the potential setting of the adjustment means by changing either the setting of the potentiometer 28, or the previously established additive or subtractive relationship between the main potential source and the auxiliary potential source. Depending upon the concentration of the fluid being tested, it is possible that after the indicating means has been calibrated in accordance with the temperature of the fluid, the needle 50 may be off scale with respect to the scale 47. I prefer, therefore, to provide in connection with this form of the invention, a scale-selecting means 55 in the form of a pair of shunts 56 and 57 bridging the indicating means 13 in parallel relationship, as shown, there being switches 58 and 59 suitably arranged to selectively bridge the indicating means 13 by either of the shunts 56 or 57. The arrangement and magnitude of the shunts 56 and 57 and the scales 48 and 49 are such that when one of the scale-selecting switches, for instance, the switch 58, is closed, the position of the needle 50 of the indicating means will indicate concentrations on the scale 48, and when the other selector switch 59 is closed, the needle 50 will indicate concentrations on the scale 49. As the resistances of the indicating means 13 and the shunts 56 and 57 are extremely small compared with the resistance of the total circuit, especially compared with the resistance of the fluid, the arrangement just described may be used without materially changing the characteristics of the circuit 12 previously established in calibrating the indicating means 13, so that the same temperature setting may be used for all of the scales 47 to 49. The shunts 56 and 57 in connection with the indicating means 13, provide desirable flexibility of the indicating means for testing fluids of widely varying conductivity without changing the characteristics of the circuit.

With reference to Figs. 3 and 4, I show an alternative form of the invention which comprises an alternating current system, the circuit 12 of this form of the invention being connected to a supply line which forms a potential source 60. The adjustment means 16, of this form of the invention, comprises a voltage regulating means 17 in the form of a tapped-primary transformer 61, and a compensating means 18 including a potentiometer 62. As shown, the tapped primary of the transformer 61 provides a plurality of taps 63 which are engageable by a movable contact 64 which in turn is connected by a conductor 65 to one side of the line 60. The potentiometer 62 includes a movable lead 66 which is connected by a conductor 67 to the other side of the line 60. Connected across the potentiometer 62 is an auxiliary winding 68 which is preferably connected to the primary of the transformer 61 in additive or subtractive relationship therewith through a reversing switch 69. In some instances it is preferable that the auxiliary winding 68 comprise a portion of the primary of the transformer. In such an instance the potentiometer 62 would be tapped directly across a portion of the primary of the transformer 61.

The voltage regulating means 17, of this form of the invention, comprising the taps 63 and the movable contact 64, and the compensating means 18, comprising the potentiometer 62 and its associated auxiliary winding 68, are operable to vary the potential applied to the balance of the circuit through the secondary of the transformer 61. Connected to one end of the secondary of the transformer 61, is a movable contactor 70 of a reversing switch 71 including a pair of contacts 72 and 73, one of which, such as contact 72, is connected to one end of the calibrating impedance 14, the other end thereof being connected to a conductor 74 which completes the circuit through the indicating means 13 to the other end of the secondary of the transformer 61.

The electrodes 11 of the cartridge 37 are connected by conductors 75 and 76 respectively to the contact 73 of the reversing switch 71 and to the conductor 74 leading to the indicating mechanism 13, substantially as shown. In this form of the invention I prefer to provide an auxiliary voltage regulating means generally designated by the numeral 78 which includes a switch 79 adapted to engage a contact 80 which is connected in series with the contact 73 of the reversing switch, the movable arm of the switch 79 being tapped into the secondary of the transformer 61, as shown, by a conductor 81. In this form of the invention I provide a dial 45 which includes the calibrating scale 46, for calibrating the indicating means 13 in accordance with the temperature of a fluid to be tested, and includes a plurality of suitably graduated scales 82 and 83 for indicating the concentration of a fluid to be tested in grains per gallon.

In the operation of this form of the invention, with the contactor 70 of the switch 71 in engagement with the contact 72, the movable contactor 64 is moved to selectively engage one of the taps 63 of the primary of the transformer 61; and the compensating means 18 is adjusted, by manipulation of the movable lead 66 of the potentiometer 62 and the reversing switch 69, to vary the potential applied to the impedance 14, causing the needle 50 of the calibrating means to assume a point on the scale 46 which corresponds to the temperature of the fluid to be tested.

After the indicating means 13 has been thus suitably calibrated, the contactor 70 of the switch 71 is moved into engagement with the contact 73 whereupon the circuit 12 is completed to the contacts, impressing a potential difference thereacross, sending current in a current path through the liquid so that the resistance of the fluid to the current is indicated by one of the scales, such as the scale 82 of the indicating means 13.

If the concentration of impurities or foreign substance in the fluid is of such character that the needle 50 is found to be off of the scale 82, the switch 79 may be moved into engagement with the contact 80 and the switch 71 moved out of engagement with the contact 73, with the result that the potential impressed across the electrodes 11 is changed to the extent that the needle 50 will be moved into reading relationship with the scale 83. It will be seen that the auxiliary voltage regulating means, comprising the switch 79 connected in tapped relationship with the primary of the transformer 61, is operable to vary the voltage applied to the electrodes without affecting the characteristics of the circuit in general after the indicating means 13 has been calibrated.

Referring to Figs. 5 and 6, I show still another form of the invention in which the circuit 12 is connected to a potential source which may be an alternating current supply line 85, the circuit including the adjustment means 16, the calibrating impedance 14, the indicating means 13, the electrodes 11, and the auxiliary voltage regulating means 78 disclosed in connection with the form of the invention just described. In the present form of the invention, the adjustment means includes a voltage regulating means 17 which comprises a tapped-primary transformer 86 providing a plurality of taps 87 connected, substantially as shown, to various coils of the primary, there being a movable engager 88 adapted to selectively contact the taps 87. The movable contactor 88 is connected by a conductor 89 to the movable lead 90 of a potentiometer 91, one side of which is connected to the line 85 by a conductor 92, and the other side of which is connected to one end of a resistance 93. The other end of the resistance 93 is connected to a conductor 94 leading from the left-hand terminal of the primary of the transformer 86 to a switch 95 which connects this conductor 94 with the line 85, substantially as shown.

In this form of the invention the taps 87 are so spaced as to change the applied voltage in steps just sufficient to compensate for various temperatures of the fluid to be tested. Each tap is marked with its corresponding temperature. One of the taps, for instance the tap indicated by the letter C, is connected to the central tap of the primary and comprises the calibrating tap of this form of the invention, and is marked with a calibrating indicia. One terminal of the secondary of the transformer 86 is connected to a reversing switch 96, including a pair of contacts 97 and 98. The contact 97 is connected to one end of the calibrating resistance 14, the other end thereof being connected to a conductor 99 completing the circuit to the other terminal of the secondary of the transformer 86 through the indicating means 13. In some instances, in this form as well as in the previously described forms, the secondary winding of the transformer may be tapped in a manner similar to that shown and described to provide the voltage regulating means of the invention. The auxiliary voltage regulating means 78 including the switch arm 79 and the contact 80 is tapped into the secondary of the transformer 86, in the same manner as disclosed in connection with the form shown in Fig. 3, by a conductor 81. Likewise, the electrodes 11 are connected respectively by conductors 100 to the contact 98 of the switch 96 and to the conductor 99.

In Fig. 6, I show a dial 45 adapted for use in connection with this form of the invention and which includes a calibrating point which may be in the form of a line 101 thereon, as shown. Suitable concentration indicating scales 102 and 103 are likewise provided.

In the operation of this form of the invention the indicating means is calibrated to the calibrating line 101 prior to regulating the adjustment means for varying the potential in accordance with the temperature of the fluid to be tested as follows. With the switch 96 in engagement with the contact 97, the movable contact 88 is first moved into engagement with the calibrating tap C of the primary of the transformer 86. The movable lead 90 of the potentiometer 91 is then adjusted until the needle 50 of the indicating means registers with the calibrating line 101 on the dial 45. The switch 96 is then thrown into engagement with the contact 98, after the immersion of the electrode cartridge 37 in the fluid to be tested, and the movable contact 88 is then moved into engagement with that one of the taps 87 which coincides with the temperature of the fluid to be tested. The resistance of the fluid to the current flow between the electrodes 11 is then indicated by the needle 50 on one of the scales, such as the scale 102.

In the event that concentration of the liquid is such that the needle is off the scale 102, the switch 96 is opened and the switch arm 79 of the auxiliary voltage regulating means may be thrown into engagement with the contact 80 which, as explained in connection with the form shown in Fig. 3, changes the potential impressed across the electrodes 11 to the extent that the needle 50 is moved into indicating relationship with the scale 103.

It will be seen that in each of the three forms of the invention disclosed and described, I provide a combination including a plurality of electrodes immersible in the fluid to be tested; circuit means connected to the electrodes for impressing potentials of different magnitudes across the electrodes for sending current in current paths through the fluid between the electrodes; indicating means in the circuit responsive to current flowing in the current paths between the electrodes; calibrating means in the circuit for calibrating the indicating means; adjustment means for varying the potential applied to the calibrating means; and switch means for selectively completing the circuit through the calibrating means or completing the circuit to the electrodes.

It should also be clear that I have provided a novel method of testing the conductivity of a fluid utilizing a system including in a circuit a current-responsive indicating means, a plurality of electrodes immersible in the fluid to be tested, and a calibrating impedance, the method being:

(1) Applying a potential to the impedance;

(2) Varying the potential applied to the impedance to calibrate the indicating means in accordance with the temperature of the fluid to be tested; and (3) Sending current in a current path between the electrodes immersed in the fluid, the resistance of the fluid to the flow of current therein being measured by the indicating means to indicate the concentration of foreign substance in the fluid.

It should be understood, however, that the invention is not intended to be limited to the details of construction disclosed in the three forms described, for the reason that various other arrangements of the parts shown might be made and various modifications of the three forms described might be devised, all coming within the scope of the invention which should be interpreted only by the appended claims.

I claim as my invention:

1. In a device for testing the conductivity of a fluid, the combination of: an electric circuit including a main potential source; a pair of electrodes immersible in the fluid to be tested; an indicating means in said circuit responsive to current flowing therein; an impedance in said circuit; switch means for selectively completing said circuit through said impedance or to said electrodes; and adjustment means for varying the potential applied to said impedance to calibrate said indicating means when said circuit is completed through said impedance, and for impressing a proportional potential across said electrodes when said circuit is completed thereto, said adjustment means including an auxiliary potential source, a reversing switch connecting said auxiliary potential source in additive or subtractive relation with said main potential source, and a potentiometer connected across said auxiliary potential source and providing a movable lead connected in said circuit.

2. In a device for testing the conductivity of a fluid, the combination of: an electric circuit including a potential source; a pair of electrodes immersible in the fluid to be tested; an indicating means in said circuit responsive to current flowing therein; an impedance in said circuit; switch means for selectively completing said circuit through said impedance or to said electrodes; and adjustment means for varying the potential applied to said impedance to calibrate said indicating means when said circuit is completed through said impedance, and for impressing a proportional potential across said electrodes when said circuit is completed thereto, said adjustment means including a voltage regulating means and a compensating means, said voltage regulating means comprising a transformer in said circuit and including a tapped winding, and said compensating means comprising an auxiliary winding connected to the winding of said transformer, and a potentiometer connected across said auxiliary winding and providing a movable lead connected in said circuit.

3. In a device for testing the conductivity of a fluid, the combination of: a plurality of electrodes immersible in said fluid; a calibrating impedance; an indicating means having a temperature scale thereon calibrated to correspond to differences in conductivity of said fluid at different temperatures; switch means for selectively connecting in series circuit with said indicating means said calibrating impedance and said electrodes; and adjustment means for varying the potential applied to said circuit by said potential source while said calibrating impedance is in said circuit for varying the reading of said indicating means until said indicating means indicates on said temperature scale the temperature of the fluid to be tested, after which said switch means is operable to disconnect said impedance from said circuit and insert said electrodes therein.

4. In a device for testing the conductivity of a fluid, the combination of: an electric circuit; a plurality of electrodes immersible in the fluid to be tested; an indicating means in said circuit responsive to current flowing therein, said indicating means having a temperature scale and one or more concentration scales thereon; an impedance in said circuit; switch means for selectively completing said circuit through said impedance or to said electrodes; and adjustment means for varying the potential applied to said impedance to cause said indicating means to indicate a point on said temperature scale corresponding to the temperature of the fluid to be tested when said circuit is completed through said impedance, and for impressing a proportional potential across said electrodes to cause said indicating means to indicate the concentration of the fluid being tested on one of said concentration scales when said circuit is completed to said electrodes.

5. In a device for testing the conductivity of a fluid, the combination of: an electric circuit; a plurality of electrodes immersible in the fluids; an indicating means in said circuit responsive to current flowing therein said indicating means having a calibrating point thereon; an impedance; switch means for selectively completing said circuit through said impedance or to said electrodes; voltage regulating means including a temperature scale for changing the potential applied to said circuit and including a calibrating indicia; compensating means for further varying said potential applied to said circuit while said circuit is completed through said impedance and while said voltage regulating means is set at said calibrating indicia to cause said indicating means to assume a position corresponding to said calibrating point prior to adjusting said voltage regulating means to a temperature on said temperature scale corresponding to the temperature of the fluid to be tested, thus calibrating said indicating means prior to completing said circuit to said electrodes.

6. In a device for testing the conductivity of a fluid, the combination of: an electric circuit including a potential source; a direct reading multi-scale meter responsive to current flowing in said circuit and including a temperature scale whereby said meter may be calibrated to the temperature of the fluid to be tested; an impedance in said circuit for calibrating said indicating means; adjustment means in said circuit including voltage regulating means and a compensating means for varying the potential applied to said impedance; a plurality of electrodes immersible in the fluid to be tested and connected in said circuit for receiving an applied potential thereacross; and switch means for selectively completing said circuit through said impedance or completing said circuit through said electrodes.

7. In a device for testing the conductivity of a fluid, the combination of: an electric circuit; a plurality of electrodes immersible in the fluid to be tested; an indicating means in said circuit responsive to current flowing therein, said indicating means having a temperature scale and one or more concentration scales thereon; an impedance in said circuit; switch means for selectively completing said circuit through said impedance or to said electrodes; adjustment means for varying the potential applied to said impedance to cause said indicating means to indicate a point on said temperature scale corresponding to the temperature of the fluid to be tested when said circuit is completed through said impedance, and for impressing a proportional potential across said electrodes to cause said indicating means to indicate the concentration of the fluid being tested on one of said concentration scales when said circuit is completed to said electrodes; and scale selecting means connectable in said circuit for causing said indicating means to successively read on said concentration scales.

8. In a device for testing the conductivity of a fluid, the combination of: an electric circuit including a potential source and an auxiliary potential source; means for connecting said auxiliary potential source to said potential source in additive or subtractive relation; a multi-scale indicating means responsive to current flowing in said circuit; an impedance in said circuit for calibrating said indicating means; adjustment means in said circuit including voltage regulating means and a compensating means for varying the potential applied to said impedance; a plurality of electrodes immersible in the fluid to be tested and connected in said circuit for receiving an applied potential thereacross; switch means for selectively completing said circuit through said impedance or completing said circuit through said electrodes; and scale selecting means connectable in said circuit for causing said indicating means to successively read on said scales thereof without varying the potential applied to said circuit.

9. In a device for testing the conductivity of a fluid, the combination of: an electric circuit; voltage regulating means for regulating potential applied to said circuit including a transformer having a main winding and an auxiliary winding; means for connecting said auxiliary winding to said main winding in additive or substractive relation; a multi-scale indicating means responsive to current flowing in said circuit; an impedance in said circuit for calibrating said indicating means; adjustment means in said circuit including voltage regulating means and a compensating means for varying the potential applied to said impedance; a plurality of electrodes immersible in the fluid to be tested and connected in said circuit for receiving an applied potential thereacross; switch means for selectively completing said circuit through said impedance or completing said circuit through said electrodes; and scale selecting means connectable in said circuit for causing said indicating means to successively read on said scales thereof without varying the primary potential applied to said circuit.

10. A method for testing the conductivity of a fluid by use of a multi-scale meter having a temperature scale thereon, a plurality of electrodes immersible in the fluid, a calibrating impedance, and a voltage adjustment means, which method includes the steps of: connecting said meter and calibrating impedance in series circuit across a potential source; adjusting the potential sending current through said meter until said temperature scale on said meter gives a reading corresponding to the temperature of the fluid to be tested; removing said calibrating impedance from said circuit; placing said electrodes in said series circuit without changing the potential setting so that a potential proportional to the original potential setting flows between the electrodes; and subsequently adjusting the potential in said circuit to cause said meter to read on a selected scale of said meter.

SOREN L. CHRISTIE.